United States Patent [19]

Aslen

[11] 4,290,717
[45] Sep. 22, 1981

[54] MACHINERY SAFETY GUARDS

[76] Inventor: Douglas E. Aslen, 16 Pinfold La., Romiley, Cheshire, England

[21] Appl. No.: 971,080

[22] Filed: Dec. 19, 1978

Related U.S. Application Data

[63] Continuation-in-part of Ser. No. 800,549, May 25, 1977, abandoned.

[30] Foreign Application Priority Data

May 28, 1976 [GB] United Kingdom ............... 22389/76

[51] Int. Cl.³ .......................................... B23B 47/00
[52] U.S. Cl. ................................. 408/241 G; 74/609
[58] Field of Search ............ 408/241 G; 74/608, 609, 74/612

[56] References Cited

U.S. PATENT DOCUMENTS

| 1,256,641 | 2/1918 | Bailey et al. ......................... 74/612 |
| 1,387,553 | 8/1921 | Miller ................................... 74/612 |
| 1,563,887 | 12/1925 | Wiepetat ............................. 74/609 |
| 2,350,247 | 5/1944 | Newell ................................. 74/612 |
| 2,382,147 | 8/1945 | Hanak .................................. 74/608 |
| 2,491,035 | 12/1949 | Deacon ............................... 74/609 |
| 2,957,375 | 10/1960 | Howlett ............................... 74/612 |
| 3,386,312 | 6/1968 | Weasler ........................... 74/612 X |
| 3,787,138 | 1/1974 | Vernon et al. ................. 408/241 G |

FOREIGN PATENT DOCUMENTS

| 340089 | 9/1921 | Fed. Rep. of Germany ........ 74/612 |
| 442313 | 2/1936 | United Kingdom .................. 74/609 |
| 484717 | 5/1938 | United Kingdom ........... 408/241 G |
| 574285 | 12/1945 | United Kingdom ........... 408/241 G |
| 588279 | 5/1947 | United Kingdom .................. 74/612 |
| 588348 | 5/1947 | United Kingdom .................. 74/612 |
| 631028 | 10/1949 | United Kingdom .................. 74/612 |

Primary Examiner—Leonidas Vlachos
Attorney, Agent, or Firm—Pearson & Pearson

[57] ABSTRACT

An easily removable safety guard for application to the barrel of a vertical drilling machine so as to overlie the drill bit comprises a coaxially arranged telescopingly connected, guard body and guard sleeve. The guard body is yieldably and resiliently retained in a mounting ring which is in turn clamped on the barrel of the drilling machine. The guard sleeve, or skirt, depends from the guard body to engage at its underside the workpiece or machine bed plate. The guard body moves progressively downwardly relative to the sleeve during progressive downward motion of the barrel. The sleeve is provided with clear-view panels therein and the guard body includes breaker bars to break off slivers of metal cut from the workpiece. Spring pressed ball catches enable the guard body with its sleeve, to be readily removed from the mounting ring with a downward extraction force.

4 Claims, 3 Drawing Figures

MACHINERY SAFETY GUARDS

CROSS REFERENCE TO RELATED APPLICATION

This application is a continuation-in-part of my patent application Ser. No. 800,549, filed May 25, 1977 and entitled Machinery Safety Guards, now abandoned.

BACKGROUND OF THE INVENTION

The invention concerns machinery safety guards, and has more particular, though not exclusive reference to guards for machines which employ a rotating cutter or like tool rotating about a vertical axis, such as milling machines or drilling machines.

Guards are known for use with drilling machines which comprise a part-cylindrical, transparent shield intended, when in a position of use, to be disposed coaxially with the drill bit, the shield extending partially around such bit in the peripheral direction thereof. In order to provide ready access to the chuck for the purpose of drill inspection, drill changing or the like, or to facilitate inspection of the workpiece, the shield is movably mounted on a ring secured to the quill or barrel of the drilling machine, being adjustable between a first, or operative position, wherein the shield and drill bit are arranged in coaxial relationship, and a second, or inoperative position, wherein the shield is pivoted upwardly and away from the drill bit about an horizontal axis transversely of the axis of the drilling head, against the restraint of spring means, the spring means holding the shield in one or other of the two extreme positions when in such position.

Other arrangements are known wherein the shield is pivotal about a generally vertical axis as defined by one or more hinges provided at a lateral edge of the shield and whereby such shield is mounted on a guard body.

Whilst the guards as aforesaid are effective in offering protection to the drilling machine operator when in an operative position, a guard may, inadvertently or otherwise, be left in an inoperative position, being held in such position by spring means, and the machine operated with the shield in such position.

DESCRIPTION OF THE PRIOR ART

Machinery safety guards of the type disclosed herein have heretofore been proposed in the following patents.
U.S. Pat. No. 2,350,247 of May 30, 1974 to Newell
U.S. Pat. No. 2,491,035 of Dec. 13, 1949, to Deacon
British Pat. No. 574,285 of Dec. 31, 1945 to Broughton
British Pat. No. 631,028 of Oct. 26, 1949 to Gibson
British Pat. No. 442,313 of Feb. 6, 1936 to Houldsworth The safety guards of these patents are permanently clamped by threaded means on the barrel of the machine, with some capable of being pivoted away from the work area for tool replacement. However they are not completely removable from the barrel of the machine by a simple downward pull or easily replaceable by a simple upward push into position on the barrel of the machine.

SUMMARY OF THE INVENTION

The primary object of the present invention is to provide an alternative guard structure to that above described, wherein the incidence of machine operation with the guard in an inoperative position will be reduced, or at best, eliminated.

According to the present invention, a machinery safety guard comprises a generally tubular guard body adapted to be mounted on a non-rotatable part of a drilling machine or the like in generally coaxial relationship with the tool to be carried by such machine and a sleeve slidably mounted on the said body, and freely movable in the axial direction thereof, the sleeve being adapted and arranged so as to make visible the region of the drilling tool.

According to a preferred feature, the guard includes a mounting ring for application to the drilling machine or the like and to which the guard body, with its guard sleeve, is releasably applied by resilient, yieldable retention means for easy extraction and replacement.

According to a further preferred feature, the guard body and/or the guard sleeve include breaker bars extending in the axial direction and at the inner face thereof.

According to a still further preferred feature, the guard body and guard sleeve include respective access slots extending upwardly from the lower edge thereof to facilitate application of the guard body to and its removal from the mounting ring.

Preferably the respective access slots in the guard body and guard sleeve are in radial and axial alignment in the retracted position of the sleeve on the body but angularly spaced in the peripheral direction of the guard in the operative position of the sleeve.

The invention will now be described further, by way of example only, with reference to the accompanying drawing which illustrates one embodiment thereof and in which.

Figure 2:
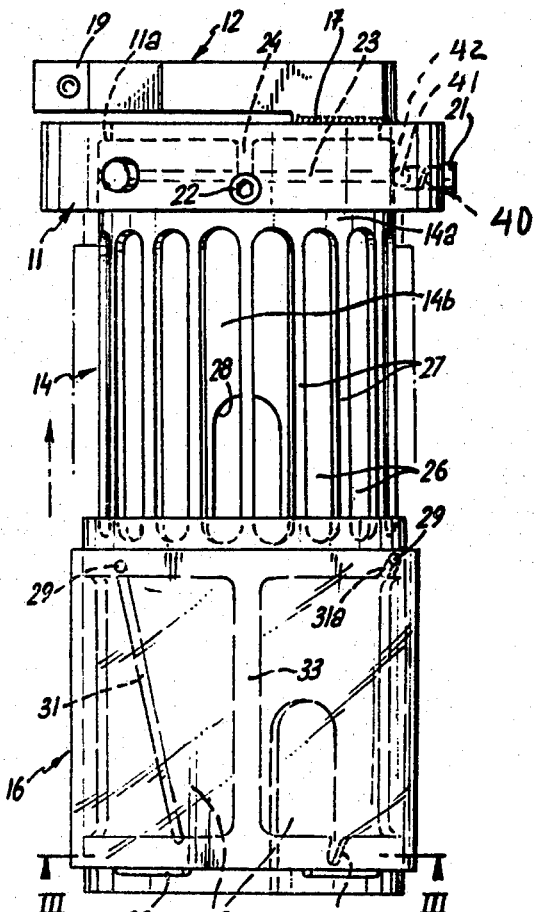
FIG. 2 is an elevation, from the opposite side to FIG. 1, of the guard structure.
Figure 3:
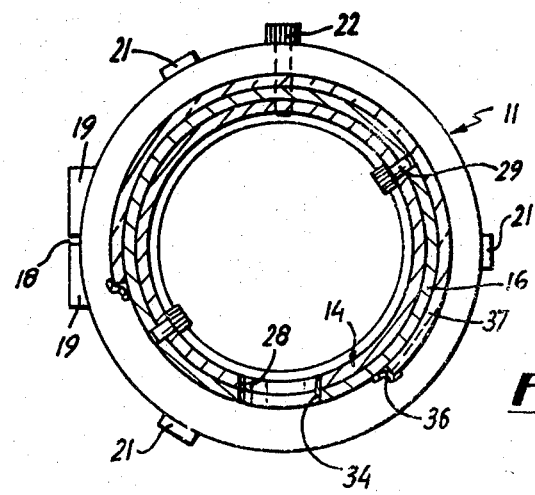
FIG. 3 is a section on line III—III of FIG. 2.

Referring now to the drawing, a guard structure constructed in accordance with the invention comprises a mounting ring 11 having a collar 12 attached thereto whereby the ring 11 is secured to the barrel 13 of a drilling machine, a guard body 14 releasably attachable to, and readily replaceable in, the mounting ring 11 to depend therefrom, and a guard sleeve 16 slidable on the said body 14 between a first position, as shown in full line in FIG. 2, wherein the sleeve 16 is supported by to depend from the bottom of the guard body 14 and a second position, as shown dotted in FIG. 2, wherein the sleeve 16 substantially overlies the said body 14.

The mounting ring 11 has a radially inwardly lipped upper end thereto to define a step or seating 11a to receive the upper end of the guard body 14, as will hereafter be described in greater detail, and the clamping collar 12 is secured in coaxial relationship with the body of the mounting ring in slightly spaced apart disposition relative thereto, being attached to the mounting ring at one diametrical location, as by a weld 17, and having an opening 18 at the opposed diametrical location bounded by radial lugs 19 through which a clamping bolt, not shown, extends.

The upper end 14a of the guard body 14, is connected to the seating 11a of the mounting ring 11 by resilient, yieldable retention means for enabling quick release of the hollow cylindrical guard body 14, and its guard sleeve 16, as a unit, with an axially exerted extraction force. Preferably the resilient yieldable retention means is in the form of three ball catches 21, each of the spring pressed type.

Three such ball catches 21 are shown, at equi-spaced locations around the mounting ring 11, each comprising a coil spring 40 which resiliently and yieldably presses a ball 41 into a hole 42 in the upper end 14a of the guard body 14. A guide pin 22 protrudes from the innerwall of the step portion 11a of the mounting ring 11, such pin 22 being provided for a purpose hereafter made apparent. Pin 22 is visible from the exterior of the mounting ring 11 to assure that the guard is re-inserted correctly into the mounting ring seat 11a, after removal, such reinsertion requiring only an upward push.

The guard body 14 is of sleeve-like form and is of such outside dimension as to be a free fit in the mounting ring 11, the upper end 14a of the body having a peripheral groove 23 so positioned thereon as to register with and to receive the ball catches 21 carried by the mounting ring 11 when the body 14 is engaged with such ring 11 and the upper end 14a thereof abuts the step 11a. If preferred, angularly spaced recesses may be provided in the upper end of the guard, each to receive a respective one of the ball catches into engagement therewith.

The upper end 14a of the guard body includes an axially extending slot 24 for co-operation with the guide pin 22 to locate the guard body in a requisite disposition in the peripheral direction of the mounting ring.

A plurality of parallel, side-by-side slits 26 is formed in the guard body, the slits 26 extending in the axial direction of such body, and being provided throughout substantially the whole of the periphery thereof, to define spaced longitudinal bars 27 extending between upper and lower end rings of the body. An access slot 28 is provided at the lower edge of the guard body, such slot extending upwardly from the lower edge of the body through approximately one half of the full axial extent thereof and being in diametrically opposed disposition with respect to the slot 24 at the upper end of the body. The access slot 28 is provided in that part 14b of the guard body devoid of axially extending slits.

The bottom end ring carries at least one diametrically opposed, outwardly extending slide pin 29, for engagement and co-operation with respective inclined slit formations 31, in the guard sleeve, as will hereinafter be described.

The guard sleeve 16 is made captive on the guard body by engagement of the slide pins 29 carried by the guard body with the slit formations 21, the sleeve being a free sliding fit on the body, and downward movement of the sleeve being limited by abutment of pins with the upper ends of the formations 31.

A plurality of apertures 32, is provided in the guard sleeve 16, the apertures, in the embodiment illustrated, being two in number and such apertures being separated by a longitudinally extending bar 33. The apertures extend through approximately 270° in the peripheral direction of the sleeve, and their axial extent is approximately 75% of the full axial extent of the sleeve, such apertures being symmetrically positioned in the axial direction of the sleeve. An access slot 34 is provided in the non-apertured part 16a of the sleeve, such slot 34 being of like form and dimensions to that slot 28 provided in the guard body 14, and the corresponding slots 28, 34 being in register when the sleeve is in its non-operative position relative to the guard body.

The non-apertured part 16a of the sleeve also includes one of the slit formations 31, the other such formation comprising aligned slit parts 31a at the upper and lower edges of one of the apertures in the sleeve, the two slit formations 31 being provided at diametrically aligned locations on the guard sleeve.

At its outer face the guard sleeve 16 is provided with cover guides 36 at the longitudinal edges of the apertures to receive a part-cylindrical, transparent cover 37, there being cover stops 38 to receive the lower edge of such cover.

In use, the mounting ring is applied to a drilling machine by engagement of the clamping collar about the quill or barrel of the drilling machine, and the guard body is offered up to and is engaged with the said mounting ring, the upper end of the body being a free fit in the ring and the body being retained in position relative to the ring by co-operation between the spring pressed ball catches and a peripheral groove in the upper end of the guard body, or preferably by the series of ball holes such as at 42.

The guard sleeve will slide downwardly on the guard body within the limits imposed by the guide slits, and will depend from such body in an operative position.

As the drill head is moved progressively downwardly as the drilling operation proceeds, so the guard sleeve will move upwardly relative to the guard body by contact with the workpiece or the platen of the drilling machine. Any slivers of metal cut from the workpiece by the drill bit will come into contact with and will be broken up by the bars on the guard sleeve or guard body, and thus, in the case of the guard sleeve, scoring and thus impairing of the transparent characteristic of the inner face of the cover will be reduced.

If it is required to examine the drill bit or workpiece more closely, the guard sleeve can be raised, but such sleeve will revert to its initial, and operative, position automatically upon release. When it is required to remove the guard structure, as for drill bit change, then the guard body is withdrawn by extraction from the mounting ring against the yieldable, resilient restraint of the spring pressed ball catches, and, with the guard sleeve moved to overlie the guard body, the body is tilted and is withdrawn beneath the tip of the drill bit, the drill bit being accommodated in the aligned access slots of the guard body and sleeve during the withdrawal motion.

As will readily be appreciated, by means of the structure hereinbefore disclosed, an effective protection will be afforded a drill operator since the guard structure extends wholly about the drill bit and extends downwardly to engage the workpiece. More importantly, whilst the guard sleeve can be moved to provide for a closer inspection of the workpiece, such sleeve will revert to its operative position on release, and thus the possibility of inadvertently operating the drilling machine with the shield out of position will be avoided.

The number and extent of the apertures in the guard sleeve may be varied to suit particular requirements.

As regard either the guard body or the guard sleeves, the bars formed therein and which fulfil the function of breaking up of swarf may be dispensed with and the physical break-up of the swarf be effected by the individual wires of a heavy wire mesh provided in apertured regions of the body and/or sleeve.

Figure 1:
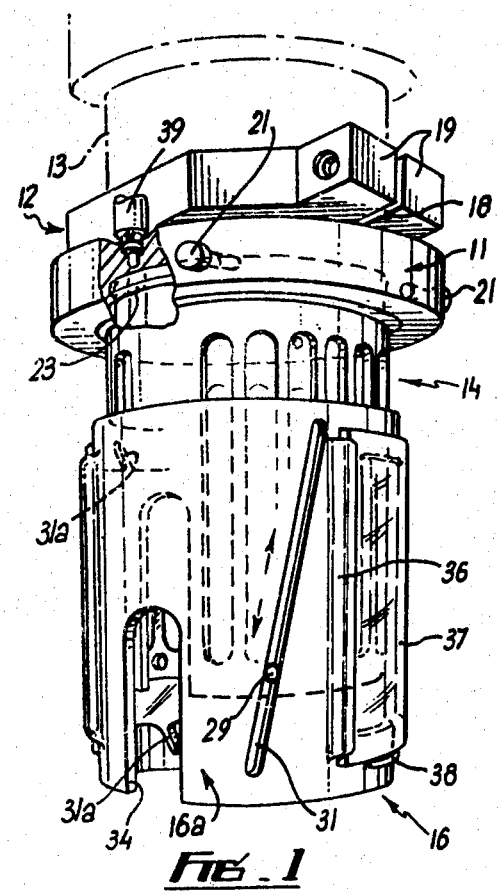
FIG. 1 is a perspective view, from below and to one side, of a guard structure constructed in accordance with the invention.

If desired, the guard structure may include an automatic cut-out switch to prevent operation of the drilling machine to which the guard structure is applied save when such structure is in an operative position, a suitable switch being shown at 39 (FIG. 1).

The invention is not restricted to the exact features of the embodiment disclosed, since alternatives will readily present themselves to one skilled in the art.

I claim:

1. A machinery safety guard for encircling a tool comprising a mounting ring for application to a non-rotatable part of a drilling machine or the like in generally coaxial relationship with the tool to be carried by such a machine; a generally tubular guard body releasably attachable to the said mounting ring; resilient, yieldable, retention means attaching the upper end of said guard body to said mounting ring for quick release thereof by an extraction force; a guard sleeve slidably mounted on said body and freely movable in the axial direction thereof, the sleeve being adapted and arranged so as to make visible the region of the drilling tool; respective access slots in the guard body and guard sleeve each extending upwardly from an open end in the lower edges thereof to facilitate application of the guard body to, and its removal from, the mounting ring in the presence of a drill bit, the open ended slots being of a lesser length than the elements in which the slots are respectively provided; at least one pin on the guard body for cooperation with at least one nearly vertical, sharply inclined slit in the sleeve, thereby to impart a rotational motion between the body and guard on relative axial motion therebetween to effect angular displacement, for a distance slightly greater than the width of an access slot, between the said access slots on such axial motion; whereby the respective open ended access slots in the guard body and guard sleeve register in radial and axial alignment in the retracted position of the sleeve on the body but are angularly spaced in the peripheral direction of the guard in the operative position of the sleeve to at least partially close the lower said access slot in said guard sleeve during use.

2. A machinery safety guard for encircling a tool comprising a mounting ring for application to a non-rotatable part of a drilling machine or the like in generally coaxial relationship with the tool to be carried by such machine, a generally tubular guard body releasably attachable to the said mounting ring, resilient, yieldable, retention means attaching the upper end of said guard body to said mounting ring for quick release thereof by an extraction force, a guard sleeve slidably mounted on the said body and freely movable in the axial direction thereof, the sleeve being adapted and arranged so as to make visible the region of the drilling tool, wherein the mounting ring is a hollow, unsplit bylinder of predetermined diameter free of slots and includes an integral, split clamping collar of reduced diameter arranged in closely spaced parallel disposition relative to the body of the mounting ring, the collar and ring body being one piece and secured together at one location, and the collar being split at an opposed diametrical location and having radial lugs thereat to receive a clamping bolt.

3. A machinery safety guard as claimed in claim 2, wherein said yieldable, resilient, retention means comprises at least one spring pressed ball catch provided on the mounting ring each for releasable engagement with a co-operating formation on the guard body, and further including co-operating pin and slot arrangements on the mounting ring and guard body for angular location of the guard body relative to the mounting ring said pin being visible on the exterior of said mounting ring to assure correct insertion of said guard.

4. A machinery safety guard as claimed in claim 1 or 2, wherein the guard body is fully cylindrical and includes breaker bars extending in the axial direction thereof substantially entirely therearound and wherein the guard sleeve lies radially outwardly of the guard body and is provided with at least one aperture therein, extending substantially entirely therearound there being at least one clear view panel mounted on the sleeve to overlie the said apertures, whereby the region of said tool is visible through said guard through an angular distance of about 360° and said interior breaker bars protect said panel from damage by swarf.

* * * * *